April 14, 1959     D. M. WELLS ET AL     2,881,693
BREWING HEAD FOR AUTOMATIC COFFEE BREWING APPARATUS
Filed Sept. 12, 1955
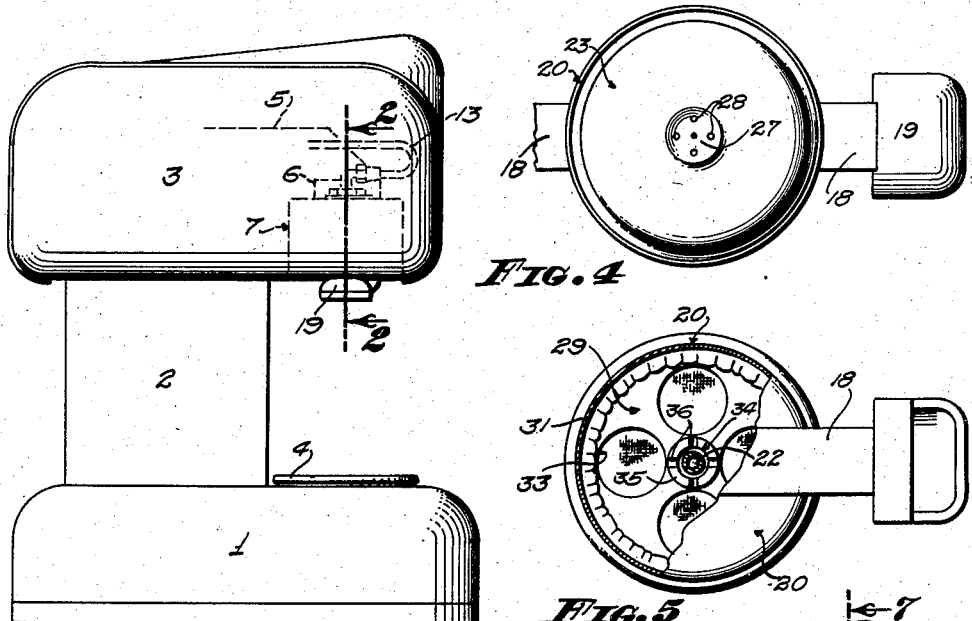
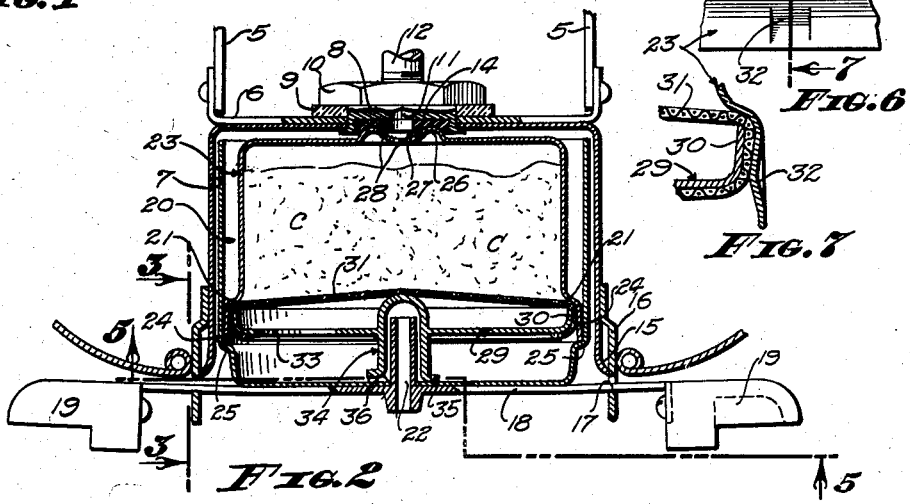
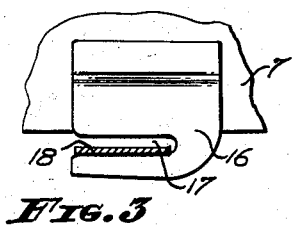
DANIEL M. WELLS
JAMES H. TARRANT
             INVENTORS.
BY *Lyon & Lyon*
ATTORNEYS United States Patent Office 2,881,693
Patented Apr. 14, 1959

2,881,693

BREWING HEAD FOR AUTOMATIC COFFEE BREWING APPARATUS

Daniel M. Wells and James H. Tarrant, Los Angeles, Calif., assignors to Western Urn Mfg. Corp., Los Angeles, Calif., a corporation of California Application September 12, 1955, Serial No. 533,723

7 Claims. (Cl. 99—307)

This invention relates to brewing heads for automatic coffee brewing apparatus, and more particularly to brewing heads for coffee brewing apparatus of the type designed to produce repeated charges of coffee infusion as required in restaurants and similar places. Such apparatus includes a means of heating water for the coffee, and automatic control mechanism arranged to pass a predetermined quantity of hot water through coffee contained in a brewing head and discharge the coffee infusion into a receptacle for use.

Included in the objects of this invention are:

First, to provide a brewing head which may be readily and quickly filled with a charge of coffee and inserted in a coffee brewing apparatus for communication with a hot water supply therein, or as readily removed for insertion of a fresh charge of coffee.

Second, to provide a brewing head wherein the brewing water is first passed downwardly through the charge of coffee, then through a filter, and then allowed to collect to a predetermined level before discharging into a container.

Third, to provide a brewing head wherein a minimum of brewing water remains in the brewing head after the brewing cycle is completed.

Fourth, to provide a brewing head which is particularly easy to assemble and disassemble, and which is readily maintained in a sanitary condition.

With the above and other objects in view, as may appear hereinafter, reference is directed to the accompanying drawings in which:

Figure 1 is a side elevational view of a coffee brewing apparatus, incorporating the brewing head;

Fig. 2 is an enlarged sectional view of the brewing head, taken through 2—2 of Fig. 1 and showing adjacent portions of the coffee brewing apparatus fragmentarily;

Fig. 3 is a fragmentary sectional view, taken through 3—3 of Fig. 2 showing one of the hook members;

Fig. 4 is a reduced fragmentary plan view of the coffee brewing head removed from the coffee brewing apparatus;

Fig. 5 is a reduced fragmentary view, partially in section and partially in elevation, of the brewing head removed from the brewing apparatus, the view being taken substantially along the line 5—5 of Fig. 2;

Fig. 6 is an enlarged fragmentary side view of the infusion cup, showing the lower rim; and Fig. 7 is a further enlarged fragmentary, sectional view through 7—7 of Fig. 6, showing particularly one of the filter retaining clips.

The brewing head constituting the present invention may be incorporated in various types of coffee brewing apparatus. One type is shown in Fig. 1 and comprises externally a base shell 1, an upwardly extending pedestal shell 2, and a head shell 3 supported by the pedestal shell and extending over the base shell. The shells house a hot water storage tank and suitable control mechanism, all of which, for the purposes of the present invention, are conventional.

The forward portion of the base shell 1 carries a weighing platform 4 on which a container for coffee infusions may be placed. The platform 4 is so connected with the control mechanism that when the coffee infusion container has received a predetermined quantity of liquid the supply of hot water is shut off.

The head shell 3 contains suitable supporting brackets 5 to which is attached a cross bar 6 which in turn is secured to a brewing head housing 7. The brewing head housing is in the form of an inverted cup with vertical sides. Centered in the upper or closed end of the housing 7 is a nozzle block 8 which is secured by a washer 9 and nut 10.

The nozzle block 8 is provided with a bore 11 extending therethrough and connected by a suitable fitting 12 to a water supply line 13 within the head shell 3. The nozzle block 8 is recessed along the bore 11 to receive a yieldable gasket 14.

The lower or open end of the brewing head housing 7 is provided with a flared rim 15 which fits within an opening provided in the under side of the forwardly projecting portion of the head shell 3.

A pair of diametrically disposed hook members 16 depend from the housing 7 and are provided with slots 17 which receive the end portions of a cross bar 18. The extremities of the cross bar are provided with handles 19 so that the ends of the cross bar may be inserted simultaneously into the slots 17 for the purpose of positioning the cross bar in bridging relation across the lower or open end of the brewing head housing 7.

The cross bar 18 supports a collector cup 20 which is open at its upper end and which is adapted to fit within the brewing head housing 7 with its walls in contiguous relation to the walls of the brewing head housing. Near its lower end, adjacent the cross bar 18, the collector cup 20 is provided with an internal shoulder 21. Centered in the cross bar 18 and collector cup 20 is a discharge or siphon tube 22 which projects slightly below the cross bar and which also extends a short distance upwardly into the collector cup 20.

The collector cup 20 receives an infusion cup 23 which in the operating position of the brewing head occupies an inverted position. The lower or open end of the infusion cup 23 is provided with an enlarged rim 24, the lower edge of which rests on the shoulder 21 of the collector cup 20. The enlarged rim 24 forms an internal shoulder 25 spaced upwardly from the shoulder 21.

The upper or closed side of the infusion cup 23 is provided with a raised annular rib 26 which is adapted to be pressed into and sealed against the gasket 14. The annular rib 26 defines a recess 27 bridging the bore 11. The recess 27 is provided with suitable perforations 28 for the flow of liquid from the bore 11 into the interior of the infusion cup 23.

Fitted within the enlarged rim 24 of the infusion cup 23 is a filter retaining disc 29 having an upturned margin 30. Stretched over the upper side of the disc 29 is a filter element 31, which may be conventional. For example, a disc of filter cloth. The margins of the filter element 31 wrap around the margin 30 of the retaining disc 29.

The side walls of the enlarged rim 24 may be provided with two or more indentations 32, shown best in Figs. 6 and 7, which yieldably retain the disc 29 and filter element 31 in place. The indentations may be formed by cutting parallel slits in the rim 24 and pressing the intervening portion thereof radially inwardly.

The retaining disc 29 is provided with large apertures 33. Centered within the disc 29 is a siphon dome 34, forming internally a blind socket which fits loosely over the upwardly directed portion of the discharge tube 22. The lower extremity of the siphon dome 34 is provided with a flange 35 having radial channels 36 formed therein so that even though the flange 35 may engage the bottom of the collector cup 20 there are ample passages for the movement of liquid.

Operation of the coffee brewing head is as follows:

Granulated or pulverized coffee C is placed in the infusion cup 23 which initially occupies a position with its open end upward. The filter element 31 is placed on the filter retaining disc 29 and this assembly is pressed into the infusion cup 23. The infusion cup 23 is then inverted and set in the collector cup 20. This assembly, which comprises the coffee brewing head, is then inserted into the housing 7 and the extremities of the cross bar 18 are rotated so as to engage the hook members 16.

The cross bar 18 is formed of spring material so that on being forced into the hook members 16 sufficient bearing pressure is exerted between the annular rib 26 and the gasket 14 to form a seal. Should a slight leaking occur, however, no harm is done, as the liquid merely drains down the sides of the infusion cup 23 and into the collector cup 20.

The user of the automatic coffee brewing apparatus then sets a container, not shown, on the weighing platform 4 which may automatically initiate the brewing cycle, or the operator may close a suitable switch, depending upon the type of automatic coffee brewing apparatus employed. The brewing cycle consists in passing a predetermined quantity of hot water through the nozzle bore 11. The cycle may be terminated by the operation of the weighing platform or by other suitable means.

The hot water is discharged through the perforations 28 and caused to percolate downwardly through the charge of coffee C and then through the filter element 31 into the lower portion of the collector cup 20. The coffee infusion collects in the cup 20 until the liquid level rises to the top of the tube 22, whereupon the liquid flows downwardly therethrough into a receptacle below. After the supply of hot water has been shut off, the liquid infusion contained in the collector cup 20 is siphoned out, whereupon the brewing cycle is completed.

It will be observed that the collector cup 20 and infusion cup 23 as well as associated parts may be readily cleaned, and that the filter element 31 may be readily renewed, so that the brewing head may be maintained in a clean and sanitary condition.

It will be observed also that it is virtually impossible to malassemble the brewing head as the infusion cup 23 can only fit in one position, that is, inverted within the collector cup 20, and the collector cup can be inserted only one way within the brewing head housing 7, so that one inexperienced with the brewing head encounters no difficulty with its use.

It will be further observed that as soon as the level of the liquid infusion reaches the top of the discharge tube 22 the interior of the brewing head is entirely sealed from the surrounding air, so that oxidation of the coffee charge is maintained at a minimum during the brewing cycle. Furthermore, even prior to the insertion of the brewing head into the coffee brewing apparatus, communication between the coffee charge and the surrounding atmosphere is virtually limited to the small perforations 28, inasmuch as a relatively effective seal may be maintained between the enlarged rim 24 and the shoulder 21 of the collector cup.

While a particular embodiment of this invention has been shown and described, it is not intended to limit the same to the exact details of the construction set forth, and it embraces such changes, modifications, and equivalents of the parts and their formation and arrangement as come within the purview of the appended claims.

We claim:

1. A coffee brewing head for automatic coffee brewing apparatus having a water supply outlet and means for metering a predetermined quantity of hot water through said outlet, comprising: a collector cup; an inverted infusion cup adapted to telescope within said collector cup; a filter element across the lower open end of said infusion cup and adapted to be disposed in spaced relation with the bottom of said collector cup, said infusion cup adapted to contain coffee granules supported on said filter element; an inlet means at the closed upper end of said infusion cup adapted to sealingly engage said outlet and including a plurality of spray orifices for directing water from said outlet onto the surface of the coffee granules contained in said infusion cup, for downward movement through said coffee granules and filter to produce a coffee infusion; and a siphon unit disposed in the bottom of said collector cup adapted to effect delayed discharge of said coffee infusion from said collector cup, and to subsequently drain all of the coffee infusion from said collector cup.

2. A coffee brewing head for automatic coffee brewing apparatus having a water supply outlet and means for metering a predetermined quantity of hot water through said outlet, comprising: a collector cup; an inverted infusion cup adapted to fit within said collector cup; a filter element across the lower open end of said infusion cup and adapted to be disposed in spaced relation with the bottom of said collector cup, said infusion cup adapted to contain coffee granules supported on said filter element; an inlet means at the closed upper end of said infusion cup adapted to sealingly engage said outlet and including a plurality of spray orifices for directing water from said outlet onto the surface of the coffee granules contained in said infusion cup, for downward movement through said collector granules and filter to produce a coffee infusion; a discharge tube extending from said collector cup and projecting upwardly therein to define with the collector cup a coffee infusion collection chamber; a siphon cap fitted over said discharge tube, to cause drainage of said collection chamber after filling said drainage chamber to the upper end of said discharge tube.

3. A coffee brewing head for automatic coffee brewing apparatus having a water supply outlet and means for metering a predetermined quantity of hot water through said outlet, comprising: a collector cup having a closed bottom wall and an annular stop shoulder within its side walls adjacent said bottom wall; an inverted infusion cup having a rim adapted to rest on said stop shoulder, the side walls of said infusion cup having an internal shoulder; a filter element having a margin adapted to fit within said infusion cup in spaced relation with the bottom of said collector cup and engage said internal shoulder; means at the closed upper end of said infusion cup for sealingly engaging said outlet, and including orifices for directing water into said infusion cup and over coffee granules contained therein for seepage therethrough and through said filter element into said collector cup; and a siphon unit disposed in the bottom of said collector cup adapted to effect delayed discharge of said coffee infusion from said collector cup, and to subsequently drain all of the coffee infusion from said collector cup.

4. A coffee brewing head for automatic coffee brewing apparatus having a water supply outlet and means for metering a predetermined quantity of hot water through said outlet, comprising: a collector cup having a closed bottom wall and an annular stop shoulder within its side walls; and inverted infusion cup having a rim adapted to rest on said stop shoulder, the side walls of said infusion cup having an internal shoulder; a filter element having a margin adapted to fit within said infusion cup in spaced relation with the bottom of said collector cup and engage said internal shoulder; means at the closed upper end of said infusion cup for sealingly engaging said outlet, and including orifices for directing water into said infusion cup and over coffee granules contained therein for seepage therethrough and through said filter element into said collector cup; a discharge tube extending from said collector cup and projecting upwardly therein to define with the collector cup a coffee infusion collection chamber; a siphon cap fitted over said discharge tube, to cause drainage of said collection chamber after filling said drainage chamber to the upper end of said discharge tube.

5. A coffee brewing apparatus, comprising: a housing structure having a recess in its under side; a hot water outlet set in said recess; a collector cup open at its upper side slidable into said recess; an inverted infusion cup adapted to telescope within said collector cup; a filter element across the lower open end of said infusion cup and adapted to be disposed in adjacent but spaced relation with the bottom of said collector cup, said infusion cup adapted to contain coffee granules supported on said filter element; an inlet means at the closed upper end of said infusion cup adapted to sealingly engage said outlet and including a plurality of spray orifices for directing water from said outlet onto the surface of the coffee granules contained in said infusion cup, for downward movement through said coffee granules and filter to produce a coffee infusion; latch members disposed at the sides of said recess and depending from said housing structure; spring arms secured to the closed underside of said collector cup and extending radially outwardly therefrom for engagement with said latch members to force said collector cup and infusion cup upwardly thereby to maintain said inlet means in sealing engagement with said outlet; handle means at the extremities of said spring arms; and means in the bottom of said collector cup for discharging the coffee infusion.

6. A coffee brewing apparatus, comprising: a housing structure having a recess in its under side; a hot water outlet set in said recess; a collector cup open at its upper side slidable into said recess; an inverted infusion cup adapted to telescope within said collector cup; a filter element across the lower open end of said infusion cup and adapted to be disposed in adjacent but spaced relation with the bottom of said collector cup, said infusion cup adapted to contain coffee granules supported on said filter element; an inlet means at the closed upper end of said infusion cup adapted to sealingly engage said outlet and including a plurality of spray orifices for directing water from said outlet onto the surface of the coffee granules contained in said infusion cup, for downward movement through said coffee granules and filter to produce a coffee infusion; latch members disposed at the sides of said recess and depending from said housing structure; spring arms secured to the closed underside of said collector cup and extending radially outwardly therefrom for engagement with said latch members to force said collector cup and infusion cup upwardly thereby to maintain said inlet means in sealing engagement with said outlet; handle means at the extremities of said spring arms; and a siphon unit disposed in the bottom of said collector cup adapted to effect delayed discharge of said coffee infusion from said collector cup.

7. A coffee brewing apparatus, comprising: a housing structure having a recess in its under side; a hot water outlet set in said recess; a collector cup open at its upper side slidable into said recess; an inverted infusion cup adapted to fit within said collector cup; a filter element across the lower open end of said infusion cup and adapted to be disposed in spaced relation with the bottom of said collector cup, said infusion cup adapted to contain coffee granules supported on said filter element; an inlet means at the closed upper end of said infusion cup adapted to sealingly engage said outlet and including a plurality of spray orifices for directing water from said outlet onto the surface of the coffee granules contained in said infusion cup, for downward movement through said coffee granules and filter to produce a coffee infusion; latch members disposed at the sides of said recess; spring arms carried by said collector cup engageable with said latch members to force said collector cup and infusion cup upwardly thereby to maintain said inlet means in sealing engagement with said outlet; a discharge tube extending from said collector cup and projecting upwardly therein to define with the collector cup a coffee infusion collection chamber; a siphon cap fitted over said discharge tube, to cause drainage of said collection chamber after filling said drainage chamber to the upper end of said discharge tube.

References Cited in the file of this patent
UNITED STATES PATENTS

| | | |
|---|---|---|
| 174,983 | Spencer | Mar. 21, 1876 |
| 1,377,316 | Clermont | May 10, 1921 |
| 1,774,980 | Lambert | Sept. 2, 1930 |
| 2,484,054 | Sharp | Oct. 11, 1949 |
| 2,615,385 | Smail | Oct. 28, 1952 |
| 2,761,200 | Arnett | Sept. 4, 1956 |

FOREIGN PATENTS

| | | |
|---|---|---|
| 757,358 | France | Oct. 9, 1933 |